United States Patent [19]

Zecher et al.

[11] Patent Number: 4,517,353

[45] Date of Patent: May 14, 1985

[54] PROCESS FOR PREPARATION OF HYDANTOIN ESTERS THROUGH A MASKED POLYISOCYANATE-CARBODIIMIDE ROUTE

[75] Inventors: Wilfried Zecher; Rudolf Merten; Willi Dünwald, all of Leverkusen, Fed. Rep. of Germany

[73] Assignee: Bayer Aktiengesellschaft, Leverkusen, Fed. Rep. of Germany

[21] Appl. No.: 558,902

[22] Filed: Dec. 6, 1983

[30] Foreign Application Priority Data

Dec. 22, 1982 [DE] Fed. Rep. of Germany ....... 3247350

[51] Int. Cl.$^3$ .............................................. C08G 18/80
[52] U.S. Cl. ..................................................... 528/45
[58] Field of Search ........................................... 528/45

[56] References Cited

U.S. PATENT DOCUMENTS

| 3,397,253 | 8/1968 | Merten et al. | 528/84 |
| 3,939,122 | 2/1976 | Merten et al. | 528/45 |
| 4,005,056 | 1/1977 | Dunwald et al. | 528/45 |
| 4,196,274 | 4/1980 | Zecher et al. | 528/73 |
| 4,246,393 | 1/1981 | Zecher et al. | 528/75 |
| 4,289,868 | 9/1981 | Lewalter et al. | 528/73 |

FOREIGN PATENT DOCUMENTS 1595466  8/1981  United Kingdom .

Primary Examiner—Maurice J. Welsh
Attorney, Agent, or Firm—Connolly and Hutz

[57] ABSTRACT

This invention relates to a process for the preparation of compounds containing at least one hydantoin ring in the molecule from carbodiimides having acylurea end groups and $\alpha,\beta$-unsaturated carboxylic acid derivatives and to their further reaction with carboxylic acids containing at least one other reactive group.

9 Claims, No Drawings

PROCESS FOR PREPARATION OF HYDANTOIN ESTERS THROUGH A MASKED POLYISOCYANATE-CARBODIIMIDE ROUTE

This invention relates to a process for the preparation of compounds containing at least one hydantoin ring in the molecule from carbodiimides having acylurea end groups and $\alpha,\beta$-unsaturated carboxylic acid derivatives and to their further reaction with carboxylic acids containing at least one other reactive group.

It is known that substituted hydantoins are obtained by reacting $\alpha,\beta$-unsaturated carboxylic acid derivatives with isocyanates (DE-OS Nos. 2 654 112; 2 657 560; 2 750 771; 2 758 569 and 3 003 773). One variation of this process consists of carrying out the reaction in the presence of carbodiimidization catalysts or using the undiluted carbodiimides.

Low molecular weight hydantoins may be used in the pharmaceutical field and for plant protection. Polyhydantoins, for example, may be used as temperature-resistant polymers, in particular in the field of electrical insulation (e.g. FR-PS No. 1 484 694).

The present invention relates to a process for the preparation of compounds containing hydantoin rings, characterised in that organic polyisocyanates partially masked with lactams are converted into carbodiimides at temperatures of from $-10°$ C. to $200°$ C., preferably from $20°$ to $80°$ C., preferably in the presence of a catalyst, these carbodiimides are converted into (poly)-hydantoins by a reaction with a derivative of an $\alpha,\beta$-unsaturated carboxylic acid corresponding to the formula:

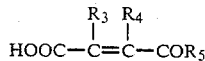

in which
$R^5$ represents $-OR^6$ or an amino group

in which
$R^6$, $R^7$ and $R^8$ represent, independently of each other, alkyl, cycloalkyl, alkenyl, alkinyl, aryl or aralkyl groups or
$R^7$ and $R^8$ may also represent hydrogen, and
$R^3$ and $R^4$ represent, independently of each other, either hydrogen or alkyl,
this reaction being carried out at a temperature of from $-20°$ C. to $250°$ C., preferably from $-20°$ C. to $180°$ C., optionally in the presence of a catalyst, and the (poly)-hydantoins obtained are reacted with carboxylic acids or carboxylic acid derivatives still containing at least one other acylurea-reactive group at temperatures of from $0°$ C. to $400°$ C., preferably from $50°$ C. to $200°$ C.

The process according to the invention constitutes a considerable advance, especially when carried out on a technical scale. The process avoids highly viscous intermediate stages which are difficult to stir and the formation of precipitates which have hitherto rendered operation on a large scale virtually impossible. It also provides a problem-free means of preparing such oligomeric hydantoins and polymeric hydantoin mixed condensates which, in their practical application, are distinguished by improved properties such as increased elasticity and age resistance.

Isocyanates partially substituted with acylurea groups, constituting reaction products of polyisocyanates and lactams, may be used according to the invention. The quantity of lactam used for this reaction is from 0.5 to 0.005 mol, preferably from 0.2 to 0.02 mol, of lactam per val of isocyanate.

Pyrrolidone, dodecane lactam and particularly caprolactam are examples of suitable lactams.

The isocyanates used for the reaction with lactams may be polyisocyanates such as those described, for example, in German Patent Application No. 3 204 129.2. Particularly suitable are the polyiso(thio)cyanates corresponding to the general formula:

in which $R^1$ represents an aliphatic group with 1-20 C-atoms, optionally substituted with halogen, alkyl and/or aryl groups, an aromatic group with 5-12 C-atoms, a cycloaliphatic group with 5-13 C-atoms, an aliphatic-aromatic group with 6-20 C-atoms or an aromatic or aliphatic cyclic group with 5-12 ring atoms containing up to three hetero atoms such as N, O or S.

Aliphatic groups with 2-12 C-atoms, aryl groups such as phenyl, tolyl or diphenylmethane and diphenylether groups are particularly preferred. In the above formula, z is an integer from 2-4, preferably 2 or 3, most preferably 2.

It is preferred to use commercially readily available mixtures of tolylene diisocyanates, m-phenylene diisocyanate and phosgenated condensates of aniline and formaldehyde which have a polyphenylene-methylene structure, and symmetrical compounds such as 4,4'-diisocyanato-diphenylmethane, 4,4'-diisocyanato-diphenylether, naphthylene-(1,5)-diisocyanate, p-phenylenediisocyanate, 4,4'-diisocyanatodiphenyl-dimethylmethane, analogous hydroaromatic diisocyanates and aliphatic diisocyanates having 2-12 C-atoms, such as hexamethylenediisocyanate and diisocyanates derived from isophorone.

Instead of using only one of the isocyanates mentioned above, mixtures of these may be used. Furthermore, the polyisocyanates may be mixed with monoisocyanates, e.g. methyl or phenyl isocyanate, in quantities of about 0.1 to 10 mol %, for example for the purpose of modifying the molecular weight.

The carbodiimides according to the invention are prepared from the above-mentioned acyl isocyanates at temperatures of from $0°$ to $200°$ C., preferably from $20°$ to $90°$ C., preferably with the aid of catalysts.

Examples of suitable catalysts include phospholines and phospholine oxides, e.g. 3-methyl-1-phenylphospholine oxide, phospholine sulphides and organometallic compounds such as phenyl lithium and diethyl zinc. A commercial mixture of 1-methyl-1-phospha-2- and 1-methyl-1-phospha-3-cyclopentene-1-oxide (methyl phospholine oxide) is particularly preferred as a catalyst.

The derivatives of $\alpha,\beta$-unsaturated carboxylic acids used preferably correspond to the general formula (I):

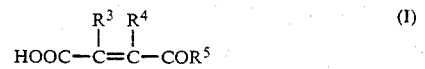

wherein
R⁵ represents —OR₆ or

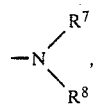

R³ and R⁴ represent hydrogen or a lower alkyl (preferably with 1–6 C-atoms) and

R⁶, R⁷ and R⁸ represent alkyl (preferably $C_1$–$C_{20}$ such as methyl, ethyl, isopropyl, hexyl, undecyl or eicosyl), cycloalkyl (preferably $C_5$–$C_{10}$ such as cyclopentyl, cyclohexyl, cycloheptyl or cyclodecyl), alkenyl(preferably $C_2$–$C_{20}$ such as allyl, butenyl, pentenyl, decenyl or eicosenyl), alkinyl (preferably $C_2$–$C_{20}$ such as propargyl, butinyl, pentinyl, hexinyl, octinyl or eicosinyl), aryl (preferably $C_6$–$C_{10}$ such as phenyl or naphthyl) and aralkyl (preferably with 6–10 C-atoms in the aryl moiety and 1–4 C-atoms in the alkyl moiety, such as benzyl, cresyl or naphthylmethyl), and R⁷ and R⁸ may also represent hydrogen.

Examples of suitable derivatives of α,β-unsaturated carboxylic acids are described, for example, in DE-OS Nos. 2 654 112; 2 657 560; 2 750 771; 2 758 569 and 3 003 773.

The derivatives of α,β-unsaturated carboxylic acids are preferably monoesters of maleic acid and of fumaric acid, e.g. the methyl, ethyl, isopropyl, undecyl, cyclohexyl, benzyl, allyl, propargyl and phenyl monoesters of fumaric acid and of maleic acid.

In one particular embodiment of the process according to the invention, mixtures or partially reacted mixtures of α,β-unsaturated cyclic dicarboxylic acid anhydrides and of hydroxyl compounds, preferably aromatic hydroxyl compounds (e.g. those disclosed in DE-OS No. 2 654 112), may be used instead of the derivatives of α,β-unsaturated carboxylic acids. In this particular embodiment of the process, it is preferred to use mixtures of maleic acid anhydride and, for example, phenol or o-, m- or p-cresols.

Carboxylic acids and carboxylic acid derivatives according to the invention containing at least one other group capable of reacting with acylureas include, for example, aliphatic and aromatic dicarboxylic acids such as adipic acid and iso- and terephthalic acid, α,β-unsaturated carboxylic acids corresponding to formula (I), aliphatic and aromatic polycarboxylic acids and their anhydrides as described in DE-OS No. 20696 and DE-OS No. 25 35335, e.g. trimesic acid, trimellitic acid anhydride, butane tetracarboxylic acid dianhydride, pyromellitic acid dianhydride, benzophenone tetracarboxylic acid dianhydride and 2,2-bis-[4-(3,4-dicarboxyphenoxy)-phenyl]-propanedianhydride and bisglycines and their esters as described in OE-P No. 1 570 552, e.g. bis-[methoxycarbonylisopropylaminophenyl]-methane; 2,2-bis-(ethoxycarbonylmethylaminophenyl)-propane and 4,4′-bis-[methoxycarbonylisopropylamino]-diphenylether. Monocarboxylic acids such as formic acid and benzoic acid and monoglycine esters such as phenylaminoacetic acid ethyl ester may also be included, preferably in a stoichiometric proportion of 1–10 mol %, for regulating the molecular weight.

According to the invention, it is preferred to use carboxylic acids such as fumaric acid monoalkyl esters, e.g. fumatic acid monoethyl ester, while trimellitic acid anhydride and bis-(methoxy-carbonylisopropylamino-phenyl)-methane or mixtures thereof are particularly preferred.

The α,β-unsaturated carboxylic acid derivative is generally used in an amount of 1 val per equivalent of carbodiimide. 1 Val of anhydride, 1 val of carboxylic acid, 1 val of glycine ester or 1 val of fumaric or maleic amido acid ester or 0.5 val of α,β-unsaturated carboxylic acid derivative is used per val of the acyl urea which has been prepared from isocyanate and lactam.

The hydantoins according to the invention which are substituted in the 5-position may be identified by their IR spectrum (e.g. by the characteristic bands for hydantoins and esters). The relatively high molecular weight hydantoins have solution viscosities of from 50 to 100,000 mPas, preferably from 100 to 10,000 mPas, determined on a 15% by weight solution in m-cresol 70 ® at 25° C.

The reaction according to the invention may be influenced by catalysts such as those mentioned, for example, in DE-OS No. 3 003 773. It has been found particularly suitable to use amines such as 1,4-diazabicyclo-(2,2,2)-octane, triethylamine, N,N-bis-(dimethylaminoethyl)-methylamine, N,N-dimethylaniline, N-ethylmorpholine and 4-dimethylaminopyridine or lactams such as caprolactam and pyrrolidone or phenols such as phenol or o-, m- or p-cresol.

The reaction according to the invention may be carried out in solvents which are either inert under the reaction conditions or only form loose addition compounds. The following solvents are suitable: (halogen)-hydrocarbons, phenols, alcohols, esters, lactones, lactams, ethers, nitriles, phosphoric acid amides, sulphoxides and sulphones. The following are specific examples: methylene chloride, carbon tetrachloride, tetrachloroethane, trichloroethylene, xylenes, o-dichlorobenzene, phenol, cresols, benzoic acid alkyl esters, dimethyl phthalate, butyrolactone, caprolactone, acetophenone, cyclohexanone, benzyl alcohol, ethylene glycol, glycol monoethyl ether acetate, diethylene glycol monoethyl ether, diethylene glycol dimethylether, dimethylformamide, N-methylpyrrolidone, caprolactam, benzonitrile, hexamethyl phosphoric acid triamide, dimethylsulphoxide, tetramethylenesulphone and mixtures thereof.

The solvent used for the reaction of the polycarbodiimide is preferably methylene chloride. According to one preferred embodiment of the process, the carbodiimide is prepared, for example, in toluene, and methylene chloride is then added prior to the reaction with the α,β-unsaturated carboxylic acids. Subsequent condensation may then be carried out after the addition of higher boiling solvents such as phenol, commercial cresol mixtures, dimethylformamide or N-methylpyrrolidone, optionally with simultaneous removal of methylene chloride and other readily volatile solvent components by distillation.

It may be advantageous to carry out the addition of the α,β-unsaturated carboxylic acids to the carbodiimide in the presence of aromatic hydroxy compounds such as phenol, aliphatic hydroxy compounds such as methanol, or lactams such as caprolactam or pyrrolidone. The progress of the reaction may be followed by IR spectroscopy.

According to the preferred embodiment, the substituted isocyanate partially formed by the addition of lactams to isocyanates is converted into the carbodiimide. Addition of the α,β-unsaturated carboxylic acid to this carbodiimide is then carried out, and this reaction is accompanied or followed by the final condensation after addition of the substituted, acylureareactive carboxylic acid.

According to another method of carrying out the process, mixtures of isocyanates and lactams or mixtures of partially carbodiimidized isocyanates and lactams are used for the preparation of acylated carbodiimides.

Lactam is generally used in a quantity of from 0.5 to 0.005 mol per mol of isocyanate, 1 val of $\alpha,\beta$-unsaturated carboxylic acid derivative is generally used per val of carbodiimide, and 1 val of substituted carboxylic acids is generally used per val of acylurea, based on the reactive groups.

The polymers according to the invention are distinguished by their temperature resistance, elasticity and abrasion resistance and are suitable, for example, for the preparation of lacquers, wire lacquers, foils and moulded articles. Their properties may be varied within wide limits for many different fields of application by the addition of fillers, pigments and low molecular and high molecular weight components, e.g. for the preparation of lacquers and foils by mixing them with polyesters, polycarbamic esters and polyamidoimides (see e.g. DE-OS No. 2 654 112).

The parts and percentages in the following Examples are by weight.

EXAMPLE 1

1000 g of 4,4'-diisocyanatodiphenylmethane and 45.2 g of caprolactam in 1360 g of toluene are heated to 100° C. for 15 minutes. The reaction mixture is then cooled to 40° C. and 4 g of methylpholine oxide (commercial mixture of 1-methyl-1-phospha-2- and 1-methyl-1-phospha-3-cyclopentene-1-oxide) are added. Carbodiimide formation takes place with elimination of $CO_2$. The temperature is raised to 50° C. in accordance with the rate of which evolution of gas takes place and is maintained at that level until no more $CO_2$ is evolved. 1360 g of methylene chloride are then added. A stable solution of the modified polycarbodiimide is obtained (this shows the characteristic IR band for carbodiimides at 2150 $cm^{-1}$). The reaction mixture is then cooled to 40° C. and 200 g of phenol are added at this temperature followed by the portionwise addition of 496 g of monomethyl maleate with cooling. A stable solution of a polyhydantoin ester substituted with acylurea end groups is obtained. 1480 g of a mixture of equal parts of phenol and a commercial cresol mixture are added to the solution. The temperature is then raised to 180° C. in the course of about 6 hours, during which methylene chloride and toluene distil off. Heating is interrupted at 90° C. for the addition of 38.4 g of trimellitic acid anhydride. As soon as a temperature of 180° C. is reached after further heating, 1480 g of phenol/cresol are introduced and stirring is continued at this temperature for 4 hours. A 33% solution of the modified polyhydantoin ester is obtained (viscosity at 25° C.=13,900 mPas, characteristic bands for hydantoins at 1715 and 1775 $cm^{-1}$ in the IR spectrum).

EXAMPLE 2

A solution of the polyhydantoin ester in toluene/methylene chloride/phenol is prepared as in Example 1, using the proportions indicated there. The reaction mixture is then diluted with 1200 g of phenol/cresol, the temperature is raised to 60° C., and 79.6 g of bis-[methoxycarbonyl-isopropyl-aminophenyl-(4)]-methane are introduced at this temperature. The reaction mixture is again diluted with 1400 g of phenyl/cresol and the temperature is raised to 180° C. in the course of about 5 hours. Methylene chloride and toluene distil off. This removal of the solvents by distillation may be carried out under a slight vacuum. A clear solution of the polyhydantoin is obtained after 4 hours at 180° C. (viscosity at 25° C.=51,600 mPas, bands at 1715 and 1780 $cm^{-1}$ in the IR spectrum).

EXAMPLE 3

A solution of polhydantoin methyl ester in toluene/methylene chloride/phenol is prepared as in Example 1, using the proportions indicated there. 1100 g of phenol/cresol (1:1) are then added, the reaction mixture is heated to 100° C., and 28.8 g of fumaric acid monoethyl ester are introduced. The temperature is then raised to 180° C. in the course of about 4 hours, during which the remaining methylene chloride and toluene distil off. The reaction mixture is then diluted with 1350 g of phenol/cresol and stirred for a further 6 hours at 180° C. The polyhydantoin ester is obtained as a clear, brown solution at a concentration of 33%. The viscosity $n^{25}$ is 38,400 mPas.

A sample of the hydantoin solution is spread over a test plate and stoved for 15 minutes at 200° C. and 15 minutes at 300° C. to produce a clear, elastic lacquer film.

EXAMPLE 4

500 g of 4,4'-diisocyanato-diphenylmethane and 45.2 g of caprolactam in 1000 g of toluene are heated to 100° C. for 15 minutes. The reaction mixture is then cooled to 40° C., 2 g of methylpholine oxide are added and carbodiimide formation is carried out, first at 40° C. and then at 50° C. 564 g of phenol are then introduced, followed by the portionwise addition of 176 g of maleic acid anhydride at 50°-55° C. The reaction is slightly exothermic. A viscous but still easily stirrable solution of the modified polyhydantoin phenyl ester is obtained (IR bands at 1705 and 1755 $cm^{-1}$). 480 g of phenol and 79.6 g of bis-[methoxy-carbonyl-isopropyl-aminophenyl-(4)]-methane are then added and the temperature is raised to 180° C. and at the same time methylene chloride and toluene distil off. The reaction mixture is then diluted with 1040 g of phenol/cresol (1:1) and stirred for a further 4 hours at 180° C. The polyhydantoin phenyl ester is obtained as a clear solution with a solids content of 33% by weight (viscosity $n^{25}$ of 31,800 mPas, characteristic bands in the IR spectrum at 1705 and 1755 $cm^{-1}$.

EXAMPLE 5

174 g of a commercial mixture of 80% of 2,4- and 20% of 2,6-tolylene diisocyanate in 400 g of toluene are reacted with 11.3 g of caprolactam at 100° C. to form the acylurea which is then converted to the polycarbodiimide at 50° C. after the addition of 1 g of methylpholine oxide. 340 g of methylene chloride and 50 g of phenol are then added and 123.5 g (0.95 mol) of monomethyl maleate are added dropwise with cooling. 200 g of phenol/cresol are then added to the reaction mixture, the temperature is raised to 70° C., and 9.6 g of trimellitic acid anhydride are introduced. The temperature is then raised to 180° C. and the reaction mixture is diluted with 265 g of phenol/cresol and stirred for a further 5 hours at 180° C. A solution of the polyhydantoin ester having a solids content of 33% by weight is obtained (viscosity $n^{25}=6200$ mPas, IR bands at 1720 and 1775 cm$^{-1}$).

A sample of the hydantoin solution on a glass plate is stoved at 200° C. and 300° C. to form a clear, hard lacquer film.

Another sample is mixed in proportions of 1:1, based on the solids content, with a polyester of terephthalic acid, glycerol and ethylene glycol, and 1% by weight of titanium tetrabutylate is added. When this mixture is stoved on a test plate at 200° C. and 300° C., it forms a clear, elastic lacquer film.

EXAMPLE 6

250 g of 4,4'-diisocyanato-diphenylmethane in 340 g of toluene are partially converted to the acylurea by reaction with 11.3 g of caprolactam for 15 minutes at 100° C. 340 g of methylene chloride and 1.5 g of methylphospholine oxide are then added and the polycarbodiimide is obtained after about 4 hours at 40°–50° C. After the addition of 50 g of phenol, 130 g of monomethyl maleate are added dropwise at 40° C. with cooling. The reaction mixture is then diluted with 285 g of phenol/cresol, the temperature is raised to 180° C. and at the same time methylene chloride and toluene are distilled off, and a further 335 g of phenol/cresol are added. The reaction mixture is then stirred for a further 4 hours at 180° C. The polyhydantoin methyl ester is obtained as a clear, brown, 33% solution (viscosity $n^{25}=54,000$ mPas).

A sample of this solution painted on a test plate forms a clear, elastic lacquer film when stoved for 15 minutes at 200° C. and 15 minutes at 300° C.

EXAMPLE 7

250 g of 4,4'-diisocyanato-diphenylmethane and 11.3 g of caprolactam in 350 g of toluene are heated to 90° C. for ½ hour and converted to the polycarbodiimide at 40° to 50° C., using 1 g of methylphospholine oxide as catalyst. The reaction mixture is then diluted with 340 g of methylene chloride and 50 g of phenol, and 123.5 g of methyl maleate are then added dropwise at 40° C. with cooling. A stable solution of the substituted polyhydantoin is obtained (bands in the IR spectrum at 1715 and 1775 cm$^{-1}$ are still unchanged after the solution has been left at room temperature for 17 hours). After the addition of 290 g of phenol/cresol, the reaction mixture is heated, 4.8 g of trimellitic acid anhydride and 10.0 g of bis[methoxy-carbonyl-isopropyl-amino-phenyl-(4)]-methane are introduced at 60° C. and the temperature is raised to 180° C. while methylene chloride and toluene distil off. The reaction mixture is further diluted with 345 g of phenol/cresol and stirred for 4 hours at 180° C. A clear solution of the polyhydantoin ester with a viscosity of $n^{25}=45,600$ mPas is obtained.

EXAMPLE 8

250 g of 4,4'-diisocyanato-diphenylmethane and 11.3 g of caprolactam in 400 g of toluene are reacted together at 100° C. to form the acyl urea which is then converted to the polycarbodiimide at 40° to 50° C. after the addition of 1 g of methylphospholine oxide as catalyst. The reaction mixture is then diluted with 700 g of N-methylpyrrolidone, and 137 g of monoethyl fumarate are introduced portionwise with cooling at 40° to 45° C. The temperature is then raised to 80° C., 9.6 g of trimellitic acid anhydride are added and the reaction mixture is stirred for 2 hours at 80° C. Toluene is then distilled off under vacuum at 80° C. and the reaction mixture is stirred for 4 hours at 120° C. and then for 2 hours at 130° C. A pale brown solution of the polyhydantoin ethyl ester having a solids content of 33% by weight is obtained (viscosity $n^{25}=4100$ mPas, IR bands at 1720 and 1775 cm$^{-1}$).

A sample of the hydantoin solution is painted on a glass plate and stoved for 15 minutes each at 200° C. and 300° C. to form a clear, elastic lacquer film.

EXAMPLES OF PRACTICAL APPLICATION TO EXAMPLE 1

The lacquer solution is diluted to a solids content of 27% with cresol/xylene (2:8) and applied to a copper wire 0.7 mm in diameter in a vertical oven 4 m in length at an oven temperature of 400° C. until the diameter of the wire has increased by 40 to 50 μm. Lacquered copper wires with excellent mechanical properties are obtained over a wide range of operating conditions. When the wire is lacquered at a speed of 16 m per minute, the maximum external fibre elongation is 88%, the heat shock is 260° C., the softening temperature is 352° C. (DIN 46453-10.2) and the scraping resistance is 41 strokes.

TO EXAMPLE 2

The lacquer solution is diluted to a solids content of 25% with cresol/xylene (2:8). A copper wire 0.7 nm in diameter, which has been lacquered as in Example 1 at a lacquering speed of 14 m per minute, has a maximum external fibre elongation of 88%, a heat shock of 260° C., a softening temperature of 414° C. and a scraping resistance of 84 strokes.

TO EXAMPLE 4

A sample of this hydantoin solution is diluted with cresol/xylene (2:8) to a solids content of 25%. When lacquering is carried out at in Example 1 an insulated copper wire, which has been lacquered to a diameter of 0.7 mm at a lacquering speed of 14 m per minute, has an elasticity of 88%, a heat shock of 260° C., a scraping resistance of 84 strokes and a softening temperature of 414° C.

TO EXAMPLE 7

The hydantoin solution prepared as described in this Example is diluted to a solids content of 25% with cresol/xylene. A copper wire, lacquered as in Example 1 to a diameter of 0.7 mm at a temperature of 400° C. and with a lacquering speed of 18 m per minute, has an elasticity of 88%, a heat shock of 260° C., a scraping resistance of 58 strokes and a softening temperature of 407° C.

We claim:

1. A process for the preparation of polymers containing hydantoin groups wherein polyisocyanates masked with from 0.5 to 0.005 mol of lactam per isocyanate group in the polyisocyanate are converted into (poly)-carbodiimides, and these carbodiimides are reacted with α,β-unsaturated carboxylic acids to form (poly)hydantoins, and these (poly)hydantoins are reacted with additional carboxylic acids or anhydrides or esters thereof which contain at least one free carboxylic acid group capable of reacting with acylureas, and said α,β-unsaturated carboxylic acids are of the formula

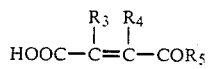

wherein

R⁵ represents -OR⁶ or

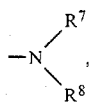

R⁶, R⁷ and R⁸ represent, independently of each other, alkyl, cycloalkyl, alkenyl, alkinyl, aryl or aralkyl groups and additionally, R⁷ and R⁸ may also represent hydrogen, and R³ and R⁴ represent, independently of each other, either hydrogen or alkyl.

2. A process according to claim 1, characterised in that the α,β-unsaturated carboxylic acid esters used are monoalkyl esters of fumaric acid and of maleic acid.

3. A process according to claim 1, characterised in that the α,β-unsaturated carboxylic acid esters used are mixtures of phenol or cresols and maleic acid anhydride.

4. A process according to claim 1, characterised in that the additional carboxylic acids are fumaric acid monoalkyl esters.

5. A process according to claim 1, characterised in that the additional carboxylic acids used are tri- or tetra-carboxylic acids or their anhydrides.

6. A process according to claim 1, characterised in that the additional carboxylic acid used is trimellitic acid anhydride.

7. A process according to claim 1, characterised in that the additional carboxylic acids used are bisglycine esters.

8. (Poly)carbodiimides having acylurea end groups prepared according to claim 1.

9. (Poly)hydantoins having acylurea end groups prepared according to claim 1.

* * * * *